L. M. WOODCOCK.

Improvement in Driving-Gears of Elastic or Yielding Rollers.

No. 130,349. Patented Aug. 6, 1872.

Witnesses.
D. P. Cowl
Edmund Masson

Inventor.
Leonard M. Woodcock,
By Atty. A. B. Stoughton

UNITED STATES PATENT OFFICE.

LEONARD M. WOODCOCK, OF AUBURN, NEW YORK.

IMPROVEMENT IN DRIVING-GEARS OF ELASTIC OR YIELDING ROLLERS.

Specification forming part of Letters Patent No. 130,349, dated August 6, 1872.

*To all whom it may concern:*

Be it known that I, LEONARD M. WOODCOCK, of Auburn, in the county of Cayuga and State of New York, have invented certain new and useful Improvements in the Driving-Gears of Elastic or Yielding Rollers, more particularly applicable to wringing or squeezing machines, but useful for any and all kinds of feed-rolls that are required to separate without running out of gear, and that the following is a full, clear, and exact description of the same, reference being had to the accompanying drawing making a part of this specification, in which—

Figure 1:
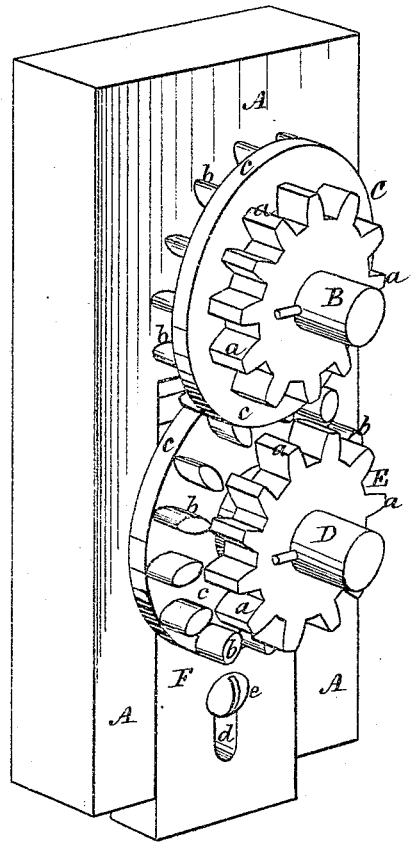
Figure 2:
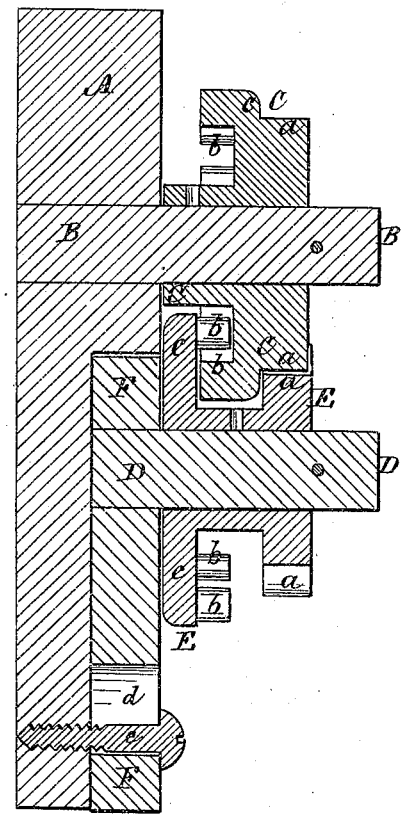
Figure 3:
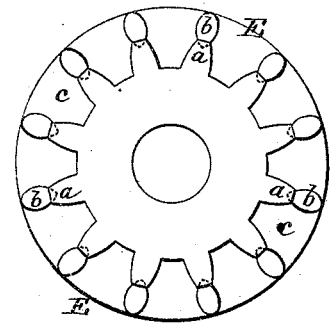

Figure 1 represents, in perspective, the gears in question, and the mode of arranging the same; Fig. 2 represents a vertical section thereof; and Fig. 3 represents a face view of one of the gears, showing the two sets of cogs, their shape, and location in relation to each other.

My invention relates to the construction of gears for yielding-rolls, which gears have upon them both an external and an internal row or series of teeth or cogs, one or the other of which series is constantly working or driving the rolls, and without lost motion, though the rolls may separate or yield to the varied thicknesses of the material that passes between them.

To enable others skilled in the art to make and use my invention, I will proceed to describe the same with reference to the drawing.

A bed, base, pillar block, or housing, A, may support a roller neck or journal, B, which may turn in a fixed bearing, or be a fixture itself, and the gear C turn upon the journal as a bearing, as the particular object to be attained may require. This cogged wheel C has two kinds of gears upon it—viz., the external and ordinary cogged gear *a*, and the internal egg, pear, or seed-shaped gears *b*, the tier of cogged teeth *a* being of less diameter than the other series *b*, and the two sets of teeth or cogs in this wheel are separated by a head or disk, *c*, interposed between them. The outer perimeter of the external gears *a* slightly overlaps the inner perimeter of the internal gears *b*, as distinctly seen in Fig. 3, so that as one set of gears runs out of, and the other set into, driving action, there shall be no lost motion, one set or the other always driving. On a journal, D, that is fixed in or to a sliding support, F, arranged on the other supporting piece, A, there is another cogged wheel, E, similar in its operation to C, and only slightly differing in construction from it. In the cogged wheel C the two sets of gears are divided or separated by the head or disk *c*. In the cogged wheel E both sets of gears are on one and the same side of the head or disk *c*.

When the gears *a a* are in mesh or driving the rolls the other gears *b b* are inactive, but, of course, revolve with the gears *a a*, to which they are respectively attached; and, in revolving, each tooth of the separate pair passes in and out through the interstices or openings between the teeth of the other pair, so that they cannot jam or strike against each other. When, by the thickness of the material that passes through or under the roll or rolls, the gears *a a* are drawn out of mesh, the other set of gears, *b*, by the same action, go into mesh, and the roll or rolls turn continuously without any cessation of, or lost, motion so long as the cogged wheels C E, upon their journals or necks, turn. The particular shape and form of the teeth *b b* on the cogged wheels C E allow said teeth to roll into and out of action without jar, as one roll is separated from the other by the thickness of the material for the time being passing through, between, or under them, or one of them. There is a limit, of course, beyond which the rolls could not separate without moving the gears out of mesh, but for all practical purpose the extent of separation, as shown by the slot and set-screw at *d e*, is enough to any ordinary machine having yielding feed or squeezing-rolls. In all such machines the yielding-roll so yields against the action of a spring, or its equivalent, so that when the pressure is off from the roll it will be returned to its normal condition by the reaction of said spring, or its equivalent.

Suppose that B D were the journals or squeezing-rolls and turned with said rolls, and that the cog-wheels C and E were fastened, respectively, on said journals; then it will be readily seen how said journals, rolls, and wheels could separate to the extent of the slot *d*, and still be driven by the cogged wheels C E, one of the other set of cogs on each being always in gear or mesh.

Having thus fully described my invention, what I claim therein as new, and desire to secure by Letters Patent, is—

In combination with yielding-rolls that must separate and still be kept in motion, the pairs of cog-wheels C E, each furnished with a set of external gears, $a$, and of internal gears $b$, formed and operating together as and for the purpose described and represented.

LEONARD M. WOODCOCK.

Witnesses:
F. G. DAY,
JOHN D. VAN DUSEN.